United States Patent Office 3,530,087
Patented Sept. 22, 1970

3,530,087
ADHESIVE COMPOSITIONS OF POLYEPOXIDE AND POLYSULFONES
Barrie James Hayes, Little Eversden, and Panchanan Mitra, Manchester, England, assignors to Ciba Limited, Basel, Switzerland, a company of Switzerland
No Drawing. Filed Feb. 8, 1968, Ser. No. 703,891
Claims priority, application Great Britain, Feb. 21, 1967, 8,252/67
Int. Cl. C08g 51/04, 45/06
U.S. Cl. 260—37     13 Claims

ABSTRACT OF THE DISCLOSURE

Hardenable compositions comprising an epoxide resin, a hardening agent therefor, and a thermoplastic polysulfone resin containing a repeating unit of formula —A—SO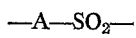— where A denotes a divalent aromatic group which may be interrupted by ether oxygen atoms and/or by divalent aliphatic groups.

---

This invention relates to hardenable compositions containing an epoxide resin and a thermoplastic polysulphone resin, to the preparation of such compositions, and to their use as adhesives.

Structural adhesive bonding is a well-established procedure in the manufacture of aircraft and in similar industries. Since aircraft are subjected to temperatures as high as +80° C., under tropical conditions, or even higher in supersonic flight, and as low as −55° C. at high altitudes, it is obviously necessary that adhesives employed in structural bonding should retain adequate strength at such extremes of temperature.

Also important in such industries are sandwich constructional elements comprising a lightweight core bonded to high strength, thin, facing sheets or skins. One of the most widely used core materials is a honeycomb material made, for example, from aluminium or resin-impregnated glasscloth. For optimum strength to weight ratio in the sandwich structure, the axes of the honeycomb core are usually arranged to be substantially at right angles to the skins. The area of contact between the cell wall material and the skins is very small compared with the area of the skins and to compensate for this the bond strength must be high. The bond strength can be increased by forming fillets of adhesive at the junctions of the skins and core material because the bonded area then extends beyond the edges of the core material, up the walls of the cells and partly onto the inner face of the skin. Desirably, therefore, the adhesive composition should flow enough during the bonding operation to form a fillet, but not excessively so that the area to be bonded is starved of adhesive, when poor bonding will occur.

It has now been found that by incorporation of certain thermoplastic polysulphone resins into hardenable epoxide resins, there may be obtained compositions which retain to a large degree their adhesive strength both at very low and at high temperatures, and which have good filleting properties. Bonds made with these compositions also have excellent metal-to-metal peel strength.

The present invention accordingly provides hardenable compositions comprising an epoxide resin, a hardening agent therefor, and a thermoplastic polysulfone resin containing a repeating unit of formula —A—SO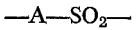— where A denotes a divalent aromatic group which may be interrupted by ether oxygen atoms and/or by divalent aliphatic groups. The invention includes within its scope a process for securing adhesion between two surfaces which comprises curing a layer of a hardenable composition as aforesaid sandwiched between, and in contact with, the two surfaces.

Preferably, the polysulphone has a heat deflection temperature, as measured by ASTM Specification D648, of at least 150° C. Preferably, too, the polysulphone has an average molecular weight of at least 10,000.

The polysulphones employed may be those obtained in a known manner by heating in an inert solvent in the presence of a Lewis acid catalyst, either (a) a sulphonyl halide of formula $HA_1SO_2X$, or (b) a mixture of a disulphonyl halide of formula $XSO_2A_1SO_2X$ with a sulphonyl halide-free compound of formula $HA_2H$, where $A_1$ and $A_2$ are the same or different and each denotes a divalent aromatic group which may be interrupted by ether oxygen atoms and/or by divalent aliphatic groups, and X denotes chlorine or bromine. The polysulphones produced by method (a) contain the repeating unit —A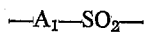—SO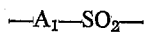— while those produced by method (b) contain the repeating unit

—A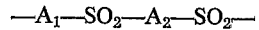—SO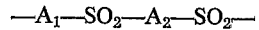—A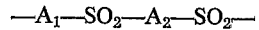—SO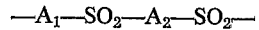—

There may also be employed polyhydroxy polyether polysulphones obtained in a known manner either (a) by reaction of a dihydric phenol, free of sulphone groups and of the formula $HOA_3OH$, with a diglycidyl ether of a dihydric phenol having two aryl groups linked by a sulphone group and of the formula:

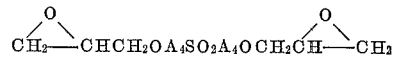

where $A_3$ and $A_4$ are divalent aryl groups, especially phenylene groups which may be substituted by chlorine or by lower alkyl groups such as methyl groups; polysulphones so obtained contain the repeating unit of formula:

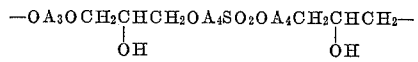

or (b) by reaction of a dihydroxydiaryl sulphone of formula $HOA_3SO_2A_3OH$ with a diglycidyl ether of a phenol, free of sulphone groups and of the formula:

where $A_3$ and $A_4$ have the meanings previously assigned: the polysulphones contain the repeating unit of formula:

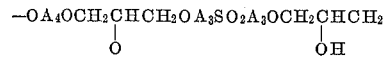

or (c) by reaction of a dihydroxydiaryl sulphone of formula $HOA_3SO_2A_3OH$ with a diglycidyl ether of a dihydric phenol having two aryl groups linked by a sulphone group and of formula:

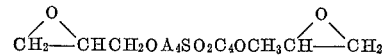

where $A_3$ and $A_4$ have the meanings previously assigned: the polysulphones contain the repeating unit of formula:

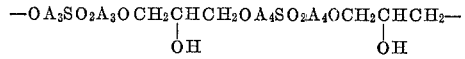

Polysulphone resins preferred for use in the compositions of the present invention are those wherein the repeating unit contains ether groups but is free from pendent hydroxyl groups, particularly the polysulphones wherein the repeating unit is of the formula:

—OAOASOO— wherein $A_3$ and $A_4$ have the meanings previously assigned. Such polysulphones are obtainable in a known manner by reaction of a di-alkali metal salt of a dihydric phenol of formula $HOA_3OH$ with a bis(monochloroaryl)sulphone of formula $ClA_4SO_2A_4Cl$ in dimethyl sulphoxide. More preferred polysulphone resins are those containing the repeating unit of formula:

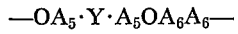

$$-OA_5 \cdot Y \cdot A_5OA_6A_6-$$

wherein $A_5$ and $A_6$ each denotes a phenylene group, which may be substituted by chlorine or by lower alkyl groups such as methyl groups, and Y denotes a carbon-carbon bond, the group $-SO_2-$, or an aliphatic hydrocarbyl group, especially one containing not more than four carbon atoms, such as those of formula:

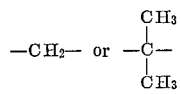

Particularly preferred are the thermoplastic polysulphone resins containing a repeating unit of formula:

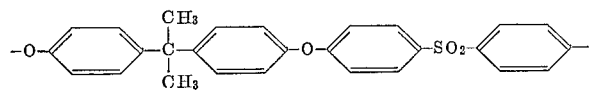

Those which are most preferred contain, per average molecule, from 50 to 120 such units.

Epoxide resins, i.e. substances containing on average more than one 1,2-epoxide group per molecule, which may be employed in the compositions of the present invention include polyglycidyl esters obtainable by reaction of a compound containing two or more free carboxyl groups with epichlorohydrin or glycerol dichlorohydrin in the presence of an alkali. Such polyglycidyl esters may be derived from aliphatic dicarboxylic acids, e.g. oxalic acid, succinic acid, glutaric acid, adipic acid, pimelic acid, suberic acid, azelaic acid, sebacic acid, or dimerised or trimerised linoleic acid; from cycloaliphatic dicarboxylic acids such as tetrahydrophthalic acid and hexahydrophthalic acid; and from aromatic dicarboxylic acids such as phthalic acid, isophthalic acid, terephthalic acid, naphthalene-2,6-dicarboxylic acid and diphenyl-2,2'-dicarboxylic acid.

Further examples of epoxide resins which may be employed are the polyglycidyl ethers obtainable by the interaction of a compound containing, per molecule, two or more alcoholic hydroxyl groups or phenolic hydroxyl groups with epichlorohydrin or glycerol dichlorohydrin under alkaline conditions or, alternatively, in the presence of an acidic catalyst with subsequent treatment with alkali. These compounds may be derived from alcohols, such as ethylene glycol, diethylene glycol, triethylene glycol, and higher polyoxyethylene glycols, propane-1,2-diol, and polyoxypropylene glycols, propane-1,3-diol, butane-1,4-diol, pentane-1,5-diol, hexane-1,6-diol, hexane-2,4,6-triol, glycerol or pentaerythritol or N-aryldialkanolamines such as N-phenyldiethanolamine and are preferably derived from phenols such as resorcinol, catechol, hydroquinone, 1,4-dihydroxynaphthalene, 1,5-dihydroxynaphthalene, bis(4-hydroxyphenyl)methane, bis(4-hydroxyphenyl)methylphenylmethane, bis(4-hydroxyphenyl)tolylmethanes, 4,4'-dihydroxydiphenyl, bis(4-hydroxyphenyl)sulphone, 1,1,2,2 - tetrakis (4 - hydroxyphenyl) ethane and, especially, 2,2-bis(4-hydroxyphenyl)propane or phenol-formaldehyde and cresol-formaldehyde novolac resins.

Aminopolyepoxides may similarly be employed, such as are, for example, obtained by the dehydrohalogenation of the reaction products of epihalohydrins and primary or disecondary amines such as aniline, n-butylamine, bis(4-aminophenyl)methane or bis(4-methylaminophenyl)methane. Other poly(N-glycidyl) compounds which may be used include triglycidyl isocyanurate, and N,N'-diglycidyl derivatives of cyclic ureas such as ethyleneurea and 1,3-propylene urea, and of hydantoins such as 5,5-dimethylhydantoin. There may also be mentioned epoxide resins obtained by the epoxidation of cyclic and acyclic polyolefins, such as vinylcyclohexene dioxide, limonene dioxide, dicyclopentadiene dioxide, 3,4-epoxydihydrodicyclopentadienyl glycidyl ether, the bis(3,-4-epoxydihydrodicyclopentadienyl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxyaldehyde and 1,1-bis(hydroxymethyl)-3,4-epoxycyclohexane, and epoxidised polybutadienes or copolymers of butadiene with ethylenic compounds such as styrene and vinyl acetate.

The epoxide resins employed suitably have a 1,2-epoxide content of at least 1 equivalent per kilogram. Those particularly preferred are the polyglycidyl ethers of 2,2-bis(4-hydroxyphenyl)propane having an epoxide content of 3.5 to 5.88 equivalents per kilogram.

There may also be employed a mixture of epoxide resins, or a mixture of an epoxide resin with a monoepoxide.

As hardeners there may be used, for example, aromatic polyamines containing at least three amino hydrogen atoms, such as p-phenylenediamine, m-phenylenediamine, bis(4-aminophenyl)methane, bis(4-aminophenyl) ether, bis(4-aminophenyl) ketone, aniline-formaldehyde resins and bis(4-aminophenyl) sulphone; polycarboxylic acid anhydrides such as maleic anhydride, succinic anhydride, dodecenylsuccinic anhydride, polyazelaic anhydride, polysebacic anhydride, phthalic anhydride, tetrahydrophthalic anhydride, hexahydrophthalic anhydride, endomethylenetetrahydrophthalic anhydride, hexachloroendomethylenetetrahydrophthalic anhydride and pyromellitic dianhydride; and catalytic hardeners such as dicyandiamide, semicarbazide and polyhydrazides such as isophthalyl dihydrazide, sebacyl dihydrazide and adipyl dihydrazide. The preferred hardeners are bis(4-aminophenyl)methane, bis(4-aminophenyl)sulphone and dicyandiamide, since they are relatively unreactive with the epoxide resin in the blending operation but cure on further heating to form products distinguished by very high adhesive strengths at elevated temperatures.

Suitably the compositions contain, per 100 parts by weight of epoxide resin, from 10 to 100 parts, especially 30 to 60 parts, by weight of the thermoplastic polysulphone resin. Aromatic polyamines and dicyandiamide employed as hardeners are preferably used in a quantity such as to afford from 0.8 to 1.2 amino-hydrogen equivalents per epoxy equivalent of the epoxide resin.

The compositions of the present invention may contain fillers such as fibres of asbestos, glass, boron or carbon, and powered metals, especially aluminium. Incorporating aluminium powder increases the adhesive strength of the cured composition at elevated temperatures, and it is an advantage of the compositions of the present invention that the thermoplastic polysulphone acts as "thickening" agent, minimising the amount of epoxide resin lost through flowing from the area to be bonded when pressure is applied. Preferred proportions of aluminium powder are from 50 to 150 parts by weight per 100 parts by weight of epoxide resin.

For use as adhesives, the compositions of the present invention are conveniently employed in film form which may be produced by dissolving the thermoplastic polysulphone resin in the epoxide resin heated to a temperature of at least 50° C. but not above 300° C., cooling the product to a temperature not higher than 130° C., incorporating the hardening agent, and shaping the mixture into a film, such as by casting or pressing. Normally, the epoxide resin will be heated to at least 150° C. so that the polysulphone dissolves rapidly, but temperatures considerably lower than this are sufficient if the polysulphone is first finely ground. A filler may be incorporated at any stage prior to the shaping operation. The compositions are cured by further heating, e.g. for 1 to 2 hours at 150° to 200° C.

The following examples illustrate the invention. Parts are by weight.

EXAMPLE 1

Tensile shear strengths of bonds formed with the adhesive compositions were determined as follows. Sheets, 1.63 mm. thick, of an aluminium alloy available under the designation "2L 73 Alclad," were degreased and subjected to a pickling process as prescribed in British Ministry of Aviation Aircraft Process Specification DTD-915B, washed in running water, and dried at room temperature. Panels were prepared, as laid down in United States Military Specification MMM-A-132, with an overlap of 1.3 cm., by applying the adhesive composition in film form, and curing at 177° C. for 1 hour under a pressure of 3.5 kg./sq. cm. The cured panels were sawn into strips 2.54 cm. wide, and pulled apart at the test temperature at 0.63 cm. per minute.

Materials employed in preparing the adhesive compositions were:

repeating units of the same formula as in "Polysulphone A."

"Polysulphone C" denotes a similar material available from Union Carbide Corporation under the designation "Polysulphone P3500"; according to the manufacturer, it had a molecular weight range lying between those of "Polysulphone A" and "Polysulphone B."

The aluminum powder employed passed 200 mesh (mesh sizes given are in accordance with British Standard 410).

The adhesive compositions were prepared by dissolving the polysulphone in the epoxide resin or mixture of epoxide resins, heated to about 260° C., cooling to about 120° C., adding the hardening agent and filler (if used), and then pressing or casting the product into a film about 0.28 mm. thick.

Table 1 shows the compositions employed, and the tensile shear strengths at various temperatures of joints prepared with these compositions.

TABLE I

| Component | Composition (parts by weight) | | | | | | | | | | | | | |
|---|---|---|---|---|---|---|---|---|---|---|---|---|---|---|
| | a | b | c | d | e | f | g | h | i | j | k | l | m | n |
| Epoxy resin A | 100 | 100 | 100 | 100 | 100 | 100 | 100 | 100 | 100 | 100 | 100 | | | |
| Epoxy resin B | | | | | | | 40 | | | | | | | |
| Epoxy resin C | | | | | | | | 40 | | | | | | |
| Epoxy resin D | | | | | | | | | 10 | 20 | 40 | | | |
| Epoxy resin E | | | | | | | | | | | | 100 | 100 | 100 |
| Polysulphone A | | | 50 | 50 | 30 | 60 | 60 | 60 | 150 | 60 | 60 | 30 | 30 | |
| Nylon | | | | | | | | | | | | | | 50 |
| Aluminium powder | | 100 | | 100 | 100 | 100 | 100 | 100 | 100 | 100 | 100 | 100 | 100 | 100 |
| Dicyandiamide | 10 | 10 | 10 | 10 | 10 | 10 | 15.5 | 16 | 12.5 | 15 | 20 | | | 10 |
| bis(4-aminophenyl)methane | | | | | | | | | | | | 30 | | |
| bis(4-amiophenyl)sulphone | | | | | | | | | | | | | 40 | |
| Tensile strength (kg./sq.cm.), measured at: | | | | | | | | | | | | | | |
| 22° C | 196 | 357 | 305 | 443 | 347 | 368 | 225 | 256 | 434 | 404 | 372 | 321 | 135 | 330 |
| 120° C | 193 | (1) | 313 | 340 | (1) | 327 | 284 | 279 | 336 | 368 | 338 | (1) | (1) | 2 29 |
| 150° C | 57 | 113 | 184 | 240 | 153 | 198 | 142 | 247 | 177 | 216 | 188 | 183 | 160 | (3) |

[1] Pot tested.
[2] Value at 82° C.
[3] Negligible.

"Epoxy resin A" denotes a polyglycidyl ether prepared in a known manner from 2,2-bis(4-hydroxyphenyl)propane and epichlorohydrin in the presence of alkali, having an epoxide content in the range 5.0–5.2 equiv./kg. and a viscosity at 21° C. in the range 200–400 poises.

"Epoxy resin B" denotes a polyglycidyl ether similarly prepared from resorcinol and epichlorohydrin, and having an epoxide content of 7.26 equiv./kg.

"Epoxy resin C" denotes an N-polyglycidylamine prepared in a known manner from bis(4-aminophenyl)-methane and epichlorohydrin in the presence of alkali, and having an epoxide content in the range 7.8–8.2 equiv./kg.

"Epoxy resin D" denotes vinylcyclohexene dioxide, having an epoxide content in the range 13–14 equiv./kg.

"Epoxy resin E" denotes a polyglycidyl ether prepared as indicated for "Epoxy resin A" and subsequently purified by crystallisation. It was semisolid at room temperature and had an epoxide content of approximately 5.7 equiv./kg.

"Polysulphone A" denotes a material available from Union Carbide Corporation under the designation "Polysulphone P1700"; according to the manufacturer, it had a melting point in the range 350–370° C., a heat deflection temperature (ASTM Specification D648) of 175° C., and contained, per average molecule, 50–80 repeating units of the formula

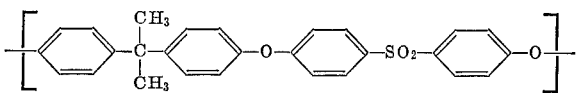

indicating a molecular weight range of approximately 22,000 to 35,000.

"Polysulphone B" denotes a similar material available from Union Carbide Corporation under the designation "Polysulphone P2300"; according to the manufacturer, it had a molecular weight range of 30,000 to 50,000, indicating it to contain, per average molecule, about 68 to 113

Composition (a) also contained 10 parts of an amine-modified clay available under the designation "Bentone 27": addition of this thixotropic agent was necessary, as otherwise the adhesive composition flowed excessively and good bonds could not be obtained. As will be seen from Table I, despite this addition, composition (a) afforded bonds much weaker, particularly at higher temperatures, than those prepared with compositions (c–m) of the present invention. Likewise, poor results at higher temperatures were obtained with composition (b), which also did not contain a polysulphone, and with composition (n) which contained a thermoplastic nylon instead of a polysulphone.

Composition (n) was prepared by heating a soluble nylon, available from E. I. du Pont de Nemours as "Zytel 61" (50 parts), with trichloroethylene (100 parts) and methanol (100 parts) under reflux until it had dissolved, adding the epoxide resin, dicyandiamide and the aluminium powder. A small amount of methanol was added so that the epoxide resin was readily incorporated. The composition was spread onto the aluminium alloy sheets and left for at least 15 hours at room temperature so that the solvents evaporated, before the joints were prepared.

EXAMPLE 2

Honeycomb sandwich structures were made by applying a film of adhesive, 0.25±0.025 mm. thick and prepared as described in Example 1, to "2L 73 Alclad" aluminium alloy sheets, 0.46 mm. thick, and bonding these to a cellular aluminium core material available under the designation "Aeroweb E 144 BP" ("Aeroweb" is a registered trademark). The alloy sheets were prepared, and the adhesive compositions cured, as described in Example 1. The sandwich structures were sawn into strips 6.6 cm. wide, and the peel strengths determined by the Climbing Drum test described in United States Military Specification MIL-A-25463 (ASG) dated Jan. 4, 1958, the peeling torque being measured by means of an Avery Universal Testing machine. Results obtained are shown in Table II.

TABLE II

| Composition: | Peeling torque (kg.-cm.) per 6.6 cm. width | |
|---|---|---|
| | Bottom face | Top face |
| a | 15.4 | 8.7 |
| d | 87 | 82 |
| i | 109 | 108 |

It will be seen that composition (a), unlike the compositions of the present invention (compositions (d) and (i)), afforded bonds of very little peel strength. The difference in peeling torques at the bottom and top faces of the core structure bonded with composition (a) shows that this composition had poor filleting properties and flowed excessively during cure.

EXAMPLE 3

Compositions (o) and (p) were prepared by mixing Epoxy resin E (75 parts) and respectively, Polysulphone B (50 parts) or Polysulphone C (50 parts) at 270° C. under nitrogen, then mixing in aluminium powder (100 parts) and a further 25 parts of Epoxy resin E, allowing the mixtures to cool to 120° C., then adding dicyandiamide (10 parts) ground to pass 150 mesh and mixing for a further half an hour at this temperature. The products were then cast into films weighing 390 g. per sq. metre.

Aluminium alloy sheets were bonded together as described in Example I except that curing was carried out at 177° C. The tensile shear strengths of the bonds measured at various temperatures are shown in Table III.

TABLE III

| | Tensile shear strength (kg./sq.cm.) at— | | | | | |
|---|---|---|---|---|---|---|
| | −55° C. | 22° C. | 82° C. | 120° C. | 150° C. | 177° C. |
| Composition: | | | | | | |
| o | 521 | 520 | (¹) | (¹) | 34 | (¹) |
| p | 457 | 430 | 398 | 349 | 225 | 94 |

¹ Not measured.

The Climbing Drum peel test carried out as described in Example 2 with composition (o) indicated an average peeling torque per 6.6 cm. width of 108 kg.-cm. This value is the average of values obtained for the top and bottom faces, but these values differed insignificantly from each other because of the excellent filleting properties of the composition.

Joints were also prepared with composition (o) as described in Example I using "Alclad 2024 T3" aluminum alloy fisheets 0.5 mm. thick, and the T-peel strength, i.e., that force applied at 180° necessary to pull the specimens apart, was determined according to United States Military Specification MMM-A-132, by means of a Hounsfield Tensiometer. The value was 32 kg./cm. Joints prepared using a composition similar to composition (o) but containing no polysulphone had T-peel strengths which were in general negligibly low and at most did not exceed 5.75 kg./cm.

What is claimed is:

1. A curable composition of matter which is suitable as adhesive comprising (a) an epoxide resin, (b) a curing agent therefor, and (c) a thermoplastic polysulfone resin having an average molecular weight of at least 10,000 composed of repeating units of the formula $$-A-SO_2-$$

where A denotes a phenylene group, phenylene groups linked by ether oxygen atoms, phenylene groups linked together by divalent aliphatic groups, and phenylene groups linked together by ether oxygen atoms and by divalent aliphatic groups, said divalent aliphatic groups containing from 1–4 carbon atoms.

2. A composition as claimed in claim 1, wherein the said polysulfone resin (c) has a heat deflection temperature, as measured by ASTM Specification D648, of at least 150° C.

3. A composition as claimed in claim 1, wherein the said polysulfone resin (c) is composed of repeating units of formula $$-OA_3OA_4SO_2A_4-$$

wherein $A_3$ and $A_4$ each denotes a member selected from the group consisting of phenylene group, phenylene group substituted by chlorine and phenylene group substituted by lower alkyl with 1 to 4 carbon atoms.

4. A composition as claimed in claim 1, wherein the said polysulfone resin (c) is composed of repeating units of formula $$-OA_5.Y.A_5OA_6SO_2A_6-$$

wherein $A_5$ and $A_6$ each denotes a member selected from the group consisting of phenylene group, phenylene group substituted by chlorine and phenylene group substituted by lower alkyl with 1 to 4 carbon atoms, and Y denotes a member selected from the group consisting of a carbon-carbon bond, the group $-SO_2-$, and a divalent aliphatic group containing from 1 to 4 carbon atoms.

5. A composition as claimed in claim 1, wherein the said polysulfone resin (c) is composed of repeating units of formula

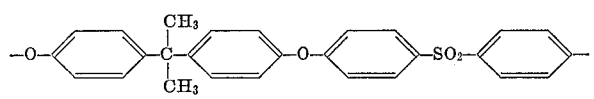

6. A composition as claimed in claim 5, wherein the said polysulfone resin (c) is composed, per average molecule, of from 50 to 120 such repeating units.

7. A composition as claimed in claim 1, which contains, per 100 parts by weight of the epoxide resin (a) from 10 to 100 parts by weight of the said polysulfone resin (c).

8. A composition as claimed in claim 7 which contains, per 100 parts by weight of the epoxide resin (a), from 30 to 60 parts by weight of the said polysulfone resin (c).

9. A composition as claimed in claim 1, which contains in addition powdered aluminium as filler.

10. A composition as claimed in claim 9, which contains from 50 to 150 parts by weight of powdered aluminium per 100 parts by weight of epoxide resin (a).

11. A composition as claimed in claim 1, wherein the curing agent is a member selected from the group consisting of bis(4 - aminophenyl)methane, bis(4 - aminophenyl)sulfone and dicyandiamide.

12. A composition as claimed in claim 11, wherein the said curing agent is present in quantity such as to afford from 0.8 to 1.2 amino-hydrogen equivalents per epoxy equivalent of the epoxide resin (a).

13. A method of producing in adhesive film form a curable composition as claimed in claim 1, which comprises dissolving the said polysulfone resin (c) in the epoxide resin (a) heated to a temperature of at least 50° C., incorporating the curing agent (b) and shaping the so-obtained mixture into a film.

(References on following page)

References Cited

UNITED STATES PATENTS 3,155,743  11/1964  Newey _____ 260—37 X
3,285,991  11/1966  Sellers _____ 260—831

MORRIS LIEBMAN, Primary Examiner
L. T. JACOBS, Assistant Examiner

U.S. Cl. X.R.

260—830